(12) United States Patent  
Shin et al.

(10) Patent No.: US 11,267,906 B2  
(45) Date of Patent: Mar. 8, 2022

(54) METHOD OF PREPARING AROMATIC VINYL COMPOUND-VINYL CYANIDE COMPOUND POLYMER AND APPARATUS FOR PREPARING THE SAME

(71) Applicant: LG CHEM, LTD., Seoul (KR)

(72) Inventors: Daeyoung Shin, Daejeon (KR); Jeong A Hwang, Daejeon (KR); Eun Jung Joo, Daejeon (KR); Won Kyun Lee, Daejeon (KR); Sungkeun Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 165 days.

(21) Appl. No.: 16/632,505

(22) PCT Filed: Jul. 9, 2019

(86) PCT No.: PCT/KR2019/008437  
§ 371 (c)(1),  
(2) Date: Jan. 20, 2020

(87) PCT Pub. No.: WO2020/130255  
PCT Pub. Date: Jun. 25, 2020

(65) Prior Publication Data  
US 2021/0061928 A1  Mar. 4, 2021

(30) Foreign Application Priority Data  
Dec. 19, 2018 (KR) .................. 10-2018-0164872

(51) Int. Cl.  
*C08F 2/01* (2006.01)  
*C08F 2/06* (2006.01)  
*B01J 19/26* (2006.01)  
*C08F 212/10* (2006.01)

(52) U.S. Cl.  
CPC ................. *C08F 2/01* (2013.01); *B01J 19/26* (2013.01); *C08F 2/06* (2013.01); *C08F 212/10* (2013.01);  
(Continued)

(58) Field of Classification Search  
USPC .................................. 526/68, 342; 422/138  
See application file for complete search history.

(56) References Cited

U.S. PATENT DOCUMENTS 3,865,672 A * 2/1975 Metzinger ................. C08F 6/10  
159/47.1  
4,058,652 A 11/1977 Smith et al.  
(Continued)

FOREIGN PATENT DOCUMENTS

JP  S5980404 A  5/1984  
JP  H1149804 A  2/1999  
(Continued)

OTHER PUBLICATIONS

Extended European Search Report dated Jul. 23, 2020 for PCT/KR2019008437, 12 pages.

*Primary Examiner* — Fred M Teskin

(57) ABSTRACT

A method of preparing an aromatic vinyl compound-vinyl cyanide compound polymer includes polymerizing a reaction mixture containing an aromatic vinyl compound, a vinyl cyanide compound, and an organic solvent in a reactor and transferring the vaporized reaction mixture present in the upper space of the reactor to a heat exchanger via a pipe and condensing the vaporized reaction mixture. The condensed reaction mixture is transferred to one side of the pipe and sprayed into the pipe, the flow velocity of the reaction mixture vaporized in the reactor is reduced, and temperature is lowered. Accordingly, a phenomenon wherein polymer particles in a reactor are sucked into a heat exchanger is  
(Continued)

10: reactor  
20: heat exchanger  
11: gas pipe  
12: condensate pipe  
13: spray nozzle prevented, and occurrence of polymerization in the heat exchanger is suppressed. Therefore, productivity and quality may be improved.

12 Claims, 1 Drawing Sheet

(52) U.S. Cl.
CPC ............... *B01J 2219/00103* (2013.01); *B01J 2219/00164* (2013.01); *B01J 2219/3325* (2013.01)

(56) References Cited

U.S. PATENT DOCUMENTS

| | | |
|---|---|---|
| 4,548,788 A | 10/1985 | Morris et al. |
| 5,348,708 A | 9/1994 | Amano et al. |
| 6,060,564 A | 5/2000 | Uchida et al. |
| 6,488,898 B1 | 12/2002 | Lee et al. |

FOREIGN PATENT DOCUMENTS

| | | |
|---|---|---|
| JP | 2003-0240479 A | 8/2003 |
| JP | 3645342 B2 | 5/2005 |
| JP | 3664576 B2 | 6/2005 |
| KR | 19950018091 A | 7/1995 |
| KR | 19950008719 B1 | 8/1995 |
| KR | 19990001928 A | 1/1999 |
| KR | 20-0439471 | 4/2008 |
| KR | 10-2011-0001185 A | 1/2011 |
| KR | 20150028615 A | 3/2015 |
| KR | 20160021604 A | 2/2016 |
| KR | 20170047031 A | 5/2017 |
| WO | WO2018046467 B1 | 3/2018 |
| WO | WO2018065347 B1 | 4/2018 |

\* cited by examiner

[FIG. 1]
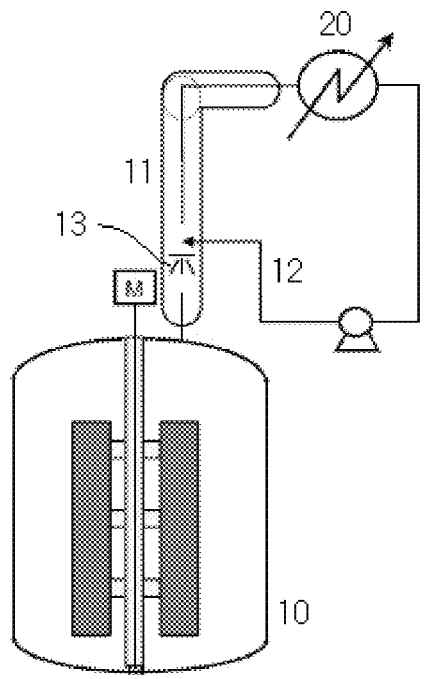
10: reactor
20: heat exchanger
11: gas pipe
12: condensate pipe
13: spray nozzle
[FIG. 2] [Prior Art]
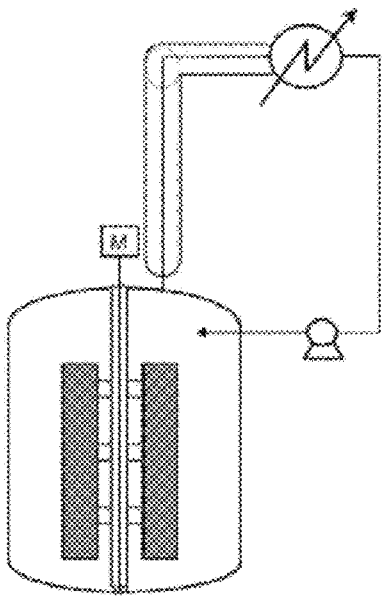

METHOD OF PREPARING AROMATIC VINYL COMPOUND-VINYL CYANIDE COMPOUND POLYMER AND APPARATUS FOR PREPARING THE SAME

CROSS-REFERENCE TO RELATED APPLICATION

This application is a National Phase entry of International Application No. PCT/KR2019/008437, filed on Jul. 9, 2019, which claims priority to Korean Patent Application No. 10-2018-0164872, filed on Dec. 19, 2018, in the Korean Intellectual Property Office, the disclosure of which is incorporated herein by reference.

TECHNICAL FIELD

The present invention relates to a method of preparing an aromatic vinyl compound-vinyl cyanide compound polymer and an apparatus for preparing the same. More specifically, the present invention relates to a method of preparing an aromatic vinyl compound-vinyl cyanide compound polymer including a step of polymerizing a reaction mixture containing an aromatic vinyl compound, a vinyl cyanide compound, and an organic solvent in a reactor and a step of transferring the vaporized reaction mixture present in the upper space of the reactor to a heat exchanger via a pipe and condensing the vaporized reaction mixture, and an apparatus for preparing the aromatic vinyl compound-vinyl cyanide compound polymer. According to the present invention, the condensed reaction mixture is transferred to one side of the pipe and sprayed into the pipe to reduce the flow velocity of the reaction mixture vaporized in the reactor and lower temperature. Accordingly, a phenomenon (i.e., a polymer entrainment phenomenon) wherein polymer particles in a reactor are sucked into a heat exchanger is prevented, and occurrence of polymerization in the heat exchanger is suppressed, thereby preventing contamination of the heat exchanger and prolonging a reaction operation cycle. Therefore, productivity and quality may be improved.

BACKGROUND ART

In general, aromatic vinyl compound-vinyl cyanide compound polymers (hereinafter referred to as "SAN resins") have excellent moldability, rigidity, and electrical properties. Because of these advantages, SAN resins are widely used in various industrial fields including OA equipment such as computers, printers, and copiers, household appliances such as televisions and audio systems, electrical and electronic parts, miscellaneous goods, and the like. In particular, heat-resistant aromatic vinyl compound-vinyl cyanide compound polymers that can withstand high external temperatures are used for housings for household appliances and interior materials for automobiles.

An aromatic vinyl compound-vinyl cyanide compound polymer is obtained by polymerizing an aromatic vinyl compound and a vinyl cyanide compound in an organic solvent. In this case, since the polymerization reaction is exothermic, the temperature inside a reactor is increased by heat of reaction during polymerization, and as a result, the aromatic vinyl compound, the vinyl cyanide compound, and the organic solvent are vaporized and are present in the upper space of the reactor. In this case, heat control technology may be applied. According to this technology, a heat exchanger is installed at the upper surface of the reactor to condense the aromatic vinyl compound, the vinyl cyanide compound, and the organic solvent vaporized during polymerization and to transfer the condensed aromatic vinyl compound, vinyl cyanide compound, and organic solvent back to the reactor. When the vaporized aromatic vinyl compound, vinyl cyanide compound, and organic solvent are transferred from the reactor to the heat exchanger via a pipe, the flow velocity of the gas in the pipe is dramatically increased. As a result, a phenomenon (i.e., a polymer entrainment phenomenon) wherein the polymer polymerized in the reactor is sucked into the heat exchanger together with the gas occurs. The polymer introduced into the heat exchanger is adhered to the inside thereof, and over time, the polymer is allowed to grow into a polymer gel. Then, the polymer gel is separated from the heat exchanger and flows into the reactor. The gel introduced into the reactor and the polymer present in the reactor adhere to each other, which causes degradation in the quality of a SAN resin. In addition, the aromatic vinyl compound, vinyl cyanide compound, and organic solvent transferred to the heat exchanger are polymerized due to the high temperature inside the heat exchanger, and the resulting polymer adheres to the heat exchanger. In this case, the reaction must be temporarily stopped to remove the adhered polymer. This may reduce productivity.

Therefore, to improve the quality and productivity of SAN resins, there is a need for a method of preventing contamination of a heat exchanger by suppressing a phenomenon wherein a polymer flows into the heat exchanger.

RELATED ART DOCUMENT

[Patent Document]
KR 1995-0008719 B1

DISCLOSURE

Technical Problem

Therefore, the present invention has been made in view of the above problems, and it is one object of the present invention to provide a method of preparing an aromatic vinyl compound-vinyl cyanide compound polymer and an apparatus for preparing the same. The method according to the present invention includes a step of polymerizing a reaction mixture containing an aromatic vinyl compound, a vinyl cyanide compound, and an organic solvent in a reactor and a step of transferring the vaporized reaction mixture present in the upper space of the reactor to a heat exchanger via a pipe and condensing the vaporized reaction mixture. In the method, to prevent a phenomenon (i.e., a polymer entrainment phenomenon) wherein polymer particles in the reactor are sucked into the heat exchanger, the condensed reaction mixture is sprayed into the pipe to reduce the flow velocity of a reaction mixture vaporized in the reactor and to lower temperature. Through this process, the quality of the aromatic vinyl compound-vinyl cyanide compound polymer may be improved. In addition, in the method of the present invention, polymerization of the vaporized reaction mixture in the heat exchanger may be suppressed to prevent contamination of the heat exchanger and to prolong a reaction operation cycle. As a result, productivity may be increased.

The above and other objects can be accomplished by the present disclosure described below.

Technical Solution

In accordance with one aspect of the present invention, provided is a method of preparing an aromatic vinyl compound-vinyl cyanide compound polymer including polymerizing a reaction mixture containing an aromatic vinyl compound, a vinyl cyanide compound, and an organic solvent in a reactor; and transferring the vaporized reaction mixture present in the upper space of the reactor to a heat exchanger via a pipe and condensing the vaporized reaction mixture, wherein the condensed reaction mixture is transferred to one side of the pipe and sprayed into the pipe.

In accordance with another aspect of the present invention, provided is an apparatus for preparing an aromatic vinyl compound-vinyl cyanide compound polymer including a reactor in which a reaction mixture containing an aromatic vinyl compound, a vinyl cyanide compound, and an organic solvent is polymerized; a heat exchanger for condensing the reaction mixture vaporized in the reactor; a gas pipe for transferring the vaporized reaction mixture from the upper space of the reactor to the heat exchanger; and a condensate pipe for transferring the condensed reaction mixture from the heat exchanger to one side of the gas pipe, wherein the condensate pipe includes a spray nozzle.

Advantageous Effects

According to the present invention, when a reaction mixture containing an aromatic vinyl compound, a vinyl cyanide compound, and an organic solvent is polymerized in a reactor, the flow velocity of the reaction mixture vaporized in the reactor can be reduced and temperature can be lowered to prevent a phenomenon (i.e., a polymer entrainment phenomenon) wherein polymer particles in the reactor are sucked into a heat exchanger and to suppress polymerization of the vaporized reaction mixture in the heat exchanger. As a result, contamination of the heat exchanger can be prevented and a reaction operation cycle can be extended. Therefore, the method of the present invention can increase productivity and quality of the aromatic vinyl compound-vinyl cyanide compound polymer.

DESCRIPTION OF DRAWINGS

FIG. 1 is a schematic drawing for explaining the method according to the present invention including a step of polymerizing a reaction mixture containing an aromatic vinyl compound, a vinyl cyanide compound, and an organic solvent in a reactor and a step of transferring the vaporized reaction mixture present in the upper space of the reactor to a heat exchanger via a pipe and condensing the vaporized reaction mixture in the heat exchanger, wherein the condensed reaction mixture is sprayed into the pipe from one side of the pipe.

FIG. 2 is a schematic drawing for explaining a conventional method including a step of polymerizing a reaction mixture containing an aromatic vinyl compound, a vinyl cyanide compound, and an organic solvent in a reactor and a step of transferring the vaporized reaction mixture present in the upper space of the reactor to a heat exchanger via a pipe and condensing the vaporized reaction mixture in the heat exchanger, wherein the condensed reaction mixture is introduced into the reactor.

BEST MODE

Hereinafter, the method of preparing an aromatic vinyl compound-vinyl cyanide compound polymer according to the present invention will be described in detail.

In general, when an aromatic vinyl compound-vinyl cyanide compound polymer is prepared, a vaporized reaction mixture containing an aromatic vinyl compound, a vinyl cyanide compound, and an organic solvent present in the upper space of a reactor is polymerized in a heat exchanger, and as a result, the inside of the heat exchanger is contaminated with the polymerized products. Furthermore, in addition to the vaporized reaction mixture, a polymer generated in the reactor is sucked into the heat exchanger, and then the polymer is re-introduced into the reactor, thereby degrading the quality of a final product. To solve these problems, the present inventors have made a ceaseless effort. As a result, the present inventors developed a method of preparing an aromatic vinyl compound-vinyl cyanide compound polymer and an apparatus for preparing the same. According to the method and apparatus of the present invention, by spraying a reaction mixture condensed in a heat exchanger from one side of a pipe into the pipe, the flow velocity of a reaction mixture vaporized in a reactor is reduced and temperature is lowered, thereby preventing a phenomenon wherein a polymer is sucked into the heat exchanger. The present inventors confirmed that, when the method and apparatus of the present invention are used, the quality of a polymer is improved and a reaction operation cycle is extended to increase productivity. Based on these results, the present inventors have further intensively studied and completed the present invention.

The method of preparing an aromatic vinyl compound-vinyl cyanide compound polymer according to the present invention will be described in detail as follows.

The method of preparing an aromatic vinyl compound-vinyl cyanide compound polymer according to the present invention includes a step of polymerizing a reaction mixture containing an aromatic vinyl compound, a vinyl cyanide compound, and an organic solvent in a reactor and a step of transferring the vaporized reaction mixture present in the upper space of the reactor to a heat exchanger via a pipe and condensing the vaporized reaction mixture. In the method of the present invention, the condensed reaction mixture is transferred to one side of the pipe and sprayed into the pipe. Through this process, the flow velocity of the reaction mixture vaporized in the reactor is reduced and temperature is lowered, thereby suppressing occurrence of polymerization inside the heat exchanger and preventing contamination of the heat exchanger. As a result, the productivity of the aromatic vinyl compound-vinyl cyanide compound polymer may be increased. In addition, a phenomenon wherein a polymer present in the reactor is sucked into the heat exchanger is prevented, thereby improving the quality of a final product.

Polymerization Step

In the polymerization step, a reaction mixture containing an aromatic vinyl compound, a vinyl cyanide compound, and an organic solvent is polymerized in a reactor.

For example, the aromatic vinyl compound may be one or more selected from the group consisting of styrene, α-methyl styrene, p-methyl styrene, p-bromostyrene, p-chlorostyrene, and o-bromostyrene.

For example, the vinyl cyanide compound may be acrylonitrile, methacrylonitrile, or a mixture thereof.

For example, the organic solvent may be one or more selected from the group consisting of toluene, ethylbenzene, xylene, methyl ethyl ketone, and methyl isobutyl ketone.

For example, the reaction mixture may contain 40 to 80% by weight of the aromatic vinyl compound, 10 to 35% by weight of the vinyl cyanide compound, and 5 to 35% by weight of the organic solvent, preferably 50 to 75% by weight of the aromatic vinyl compound, 15 to 30% by weight of the vinyl cyanide compound, and 10 to 25% by weight of the organic solvent. Within this range, mechanical properties such as tensile strength and impact strength, heat resistance, and thermal stability may be improved.

For example, based on 100 parts by weight in total of the aromatic vinyl compound and the vinyl cyanide compound, 0.1 to 10 parts by weight, preferably 0.1 to 5 parts by weight of an initiator, a molecular weight modifier, or a mixture thereof is added to the reaction mixture to perform polymerization.

For example, the initiator may be one or more selected from the group consisting of t-butyl hydroperoxide, cumene hydroperoxide, diisopropylbenzene hydroperoxide, t-hexyl hydroperoxide, 1,1,3,3-tetramethylbutyl hydroperoxide, dicumyl peroxide, and t-butyl cumyl peroxide.

For example, the molecular weight modifier may be one or more selected from the group consisting of n-dodecyl mercaptan, tertiary dodecyl mercaptan, n-tetradecyl mercaptan, and tertiary tetradecyl mercaptan.

For example, the polymerization reaction may be performed at a temperature of 140 to 170° C. under a pressure of 1.0 to 4.0 kgf/cm$^2$g, preferably at a temperature of 150 to 165° C. under a pressure of 1.5 to 3.5 kgf/cm$^2$g. Within this range, the polymerization conversion rate may be excellent.

Other additives not specifically mentioned in the present description can be appropriately selected as needed. There is no particular limitation as long as the additives are generally used to prepare aromatic vinyl compound-vinyl cyanide compound polymers.

When the aromatic vinyl compound and the vinyl cyanide compound polymer are polymerized, other reaction conditions other than the above-described conditions, such as reaction time, reaction temperature, pressure, and time points of introduction of reactants, are not particularly limited insofar as the reaction conditions are within a range that is commonly used in the art to which the present invention pertains, and can be appropriately selected and carried out as necessary.

Condensation Step

In the condensation step, a vaporized reaction mixture present in the upper space of a reactor is transferred to a heat exchanger via a pipe and condensed in the heat exchanger. Then, the condensed reaction mixture is sprayed into the pipe from one side of the pipe.

For example, the spraying may be performed so that the flow of the condensed reaction mixture is countercurrent to the flow of the vaporized reaction mixture. In this case, the flow velocity of the reaction mixture vaporized in the reactor may be reduced, and temperature may be lowered. By reducing the flow velocity of the vaporized reaction mixture, a phenomenon wherein a polymer is sucked into the heat exchanger together with the reaction mixture vaporized in the reactor may be prevented. As a result, the quality of an aromatic vinyl compound-vinyl cyanide compound polymer may be improved. When a polymer present in the reactor is sucked into the heat exchanger together with the vaporized reaction mixture, the polymer introduced into the heat exchanger is allowed to grow into a polymer gel, and the polymer gel flows into the reactor. The polymer gel introduced into the reactor and a polymer present in the reactor adhere to each other, which causes degradation in the quality of a final product. In addition, by lowering the temperature of the vaporized reaction mixture, polymerization of the reaction mixture in the heat exchanger may be suppressed, thereby preventing contamination of the heat exchanger. As a result, a reaction operation cycle may be extended to increase the productivity of a final product.

For example, the temperature of the reaction mixture transferred to the heat exchanger after spraying may be 100 to 140° C., preferably 110 to 130° C., and the temperature of the reaction mixture discharged from the heat exchanger may be 15 to 50° C., preferably 20 to 45° C. Within this range, the vaporized reaction mixture may be prevented from being polymerized in the heat exchanger, thereby preventing contamination of the heat exchanger. As a result, a reaction operation cycle may be extended to increase the productivity of a final product.

For example, the flow velocity of the reaction mixture transferred to the heat exchanger after spraying may be 1.0 to 2.0 m/sec, preferably 1.2 to 1.7 m/sec, more preferably 1.2 to 1.4 m/sec. Within this range, a phenomenon wherein a polymer present in the reactor is sucked into the heat exchanger may be prevented, thereby improving the quality of an aromatic vinyl compound-vinyl cyanide compound polymer.

In the present description, the flow velocity can be calculated by Equation 1 below.

$$\text{Flow velocity (m/sec)} = \text{Gas volumetric flow rate} / \text{Cross-sectional area of pipe} \quad \text{[Equation 1]}$$

For example, the spray may include all or a portion, preferably all, of the reaction mixture transferred to the heat exchanger. In this case, the flow of the vaporized reaction mixture is countercurrent to the flow of the condensed reaction mixture, such that the temperature and flow velocity of the vaporized reaction mixture are reduced. Consequently, a phenomenon wherein a polymer present in the reactor is sucked into the heat exchanger may be suppressed, and the vaporized reaction mixture may be prevented from being polymerized in the heat exchanger.

In the present description, countercurrent refers to a case wherein, when there is heat or material transfer between two fluids, the fluids flow in opposite directions.

In the present description, the flow rate may be measured using a flowmeter provided in a condensate pipe for spraying the reaction mixture condensed in the heat exchanger.

In the present description, the heat exchanger is not particularly limited as long as it is a heat exchanger commonly used in the art to which the present invention pertains. For example, a horizontal shell and tube heat exchanger or a vertical shell and tube heat exchanger may be used as the heat exchanger of the present invention.

The apparatus for preparing an aromatic vinyl compound-vinyl cyanide compound polymer according to the present invention includes a reactor in which a reaction mixture containing an aromatic vinyl compound, a vinyl cyanide compound, and an organic solvent is polymerized; a heat exchanger for condensing the reaction mixture vaporized in the reactor; a gas pipe for transferring the vaporized reaction mixture from the upper space of the reactor to the heat exchanger; and a condensate pipe for transferring the condensed reaction mixture from the heat exchanger to one side of the gas pipe. As a feature of this apparatus, the condensate pipe includes a spray nozzle. According to the apparatus, the flow velocity of the reaction mixture vaporized in the reactor may be reduced, and temperature may be lowered. As a result, the vaporized reaction mixture may be prevented from being polymerized in the heat exchanger, thereby preventing contamination of the heat exchanger and increasing productivity. In addition, a phenomenon wherein a polymer present in the reactor is sucked into the heat exchanger may be prevented, thereby improving the quality of a final product.

For example, the spray nozzle is installed so that a part or the whole thereof is located in the gas pipe and the flow of the condensed reaction mixture to be sprayed is countercurrent to the flow of the reaction mixture vaporized in the reactor. In this case, the flow velocity of the reaction mixture vaporized in the reactor may be reduced, and temperature may be lowered. As a result, a phenomenon (i.e., an entrainment phenomenon) wherein a polymer generated in the reactor is sucked into the heat exchanger may be prevented, thereby improving the productivity and quality of a final product.

The nozzle of the present invention is not particularly limited as long as it is a nozzle commonly used in the art to which the present invention pertains.

The descriptions of the reactor, the heat exchanger, and the reaction mixture included in the apparatus for preparing an aromatic vinyl compound-vinyl cyanide compound polymer are the same as those described above, and thus are omitted.

The method of preparing an aromatic vinyl compound-vinyl cyanide compound polymer and the apparatus for preparing the same according to the present invention are described with reference to FIGS. 1 and 2. It should be understood that these drawings are merely schematic representations of the present invention and are not to be construed as limited to the embodiments. Only means necessary for explaining the present invention are illustrated in the drawings for ease of understanding, and other means necessary for carrying out the method and apparatus are omitted from the drawings.

In FIG. 1, a reactor, a heat exchanger, a gas pipe, a condensate pipe, and a spray nozzle used in Examples 1 to are schematically illustrated. Referring to FIG. 1, a reaction mixture containing an aromatic vinyl compound, a vinyl cyanide compound, and an organic solvent is polymerized in a reactor, and the vaporized reaction mixture present in the upper space of the reactor is transferred to a heat exchanger via a gas pipe and condensed in the heat exchanger. The condensed reaction mixture is transferred to the gas pipe via a condensate pipe, and then is sprayed through a spray nozzle installed in the gas pipe. At this time, the flow of the sprayed condensed reaction mixture is countercurrent to the flow of the vaporized reaction mixture, and the sprayed condensed reaction mixture is re-introduced into the reactor.

In addition, in FIG. 2, a reactor, a heat exchanger, a gas pipe, and a condensate pipe used in Comparative Example 1 are schematically illustrated. Referring to FIG. 2, a reaction mixture containing an aromatic vinyl compound, a vinyl cyanide compound, and an organic solvent is polymerized in a reactor, and the vaporized reaction mixture present in the upper space of the reactor is transferred to a heat exchanger via a gas pipe and condensed in the heat exchanger. The condensed reaction mixture is re-introduced into the upper space of the reactor via a condensate pipe.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

The conditions for each step are shown in Table 1 below.

Example 1

<Polymerization Step>

A reaction mixture containing 60% by weight of styrene, 25% by weight of acrylonitrile, and 15% by weight of toluene was introduced into a reactor at a flow rate of 20,000 kg/hr, and polymerization was performed at a temperature of 160° C. under a pressure of 1.5 kgf/cm$^2$g.

<Condensation Step>

The vaporized reaction mixture containing styrene, acrylonitrile, and toluene present in the upper space of the reactor was transferred to a heat exchanger via a gas pipe and condensed in the heat exchanger. In this case, the temperature of a refrigerant contained in the heat exchanger was set to 35 to 37° C. The condensed reaction mixture was transferred to the gas pipe via a condensation pipe. Then, all of the reaction mixture transferred to the heat exchanger, e.g., at a flow rate of 1270 kg/hr, was sprayed to the vaporized reaction mixture through a spray nozzle located at the condensation pipe, so that the flow of the sprayed reaction mixture is countercurrent to the flow of the vaporized reaction mixture. In this case, the flow rate of the reaction mixture vaporized in the reactor was measured using a flowmeter in the condensate pipe through which the condensed reaction mixture is transferred. In addition, the flow velocity of the reaction mixture transferred to the heat exchanger after spraying was measured by Equation 1. In this case, the flow rate measured in the condensate pipe was substituted into Equation 1.

$$\text{Flow velocity (m/sec)} = \text{Gas volumetric flow rate} / \text{Cross-sectional area of pipe} \quad \text{[Equation 1]}$$

In addition, the temperature of the reaction mixture transferred to the heat exchanger after spraying and the temperature of the reaction mixture condensed in the heat exchanger and discharged from the heat exchanger were measured using a thermometer.

In addition, a prepared SAN polymer was placed in a single-screw extruder, and extrusion was performed at 250° C. and 50 rpm to obtain a sheet-type film. Through this process, the quality of the SAN polymer was evaluated.

Example 2

Example 2 was performed in the same manner as in Example 1, except that the temperature of a refrigerant contained in a heat exchanger was set to 20 to 22° C. in a condensation step, and all of the reaction mixture transferred to the heat exchanger, e.g., at a flow rate of 1210 kg/hr, was sprayed.

Comparative Example 1

<Polymerization Step>

A reaction mixture containing 60% by weight of styrene, 25% by weight of acrylonitrile, and 15% by weight of toluene was introduced into a reactor at a flow rate of 20,000 kg/hr, and polymerization was performed at a temperature of 160° C. under a pressure of 1.5 kgf/cm$^2$g.

<Condensation Step>

The vaporized reaction mixture containing styrene, acrylonitrile, and toluene present in the upper space of the reactor was transferred to a heat exchanger via a gas pipe and condensed in the heat exchanger. In this case, the temperature of a refrigerant contained in the heat exchanger was set to 30° C. The condensed reaction mixture was re-introduced into the reactor via a condensation pipe.

In this case, the flow rate of the reaction mixture vaporized in the reactor was measured using a flowmeter in the condensate pipe through which the condensed reaction mixture is transferred to the heat exchanger. In addition, the flow velocity of the gaseous reaction mixture transferred to the heat exchanger was estimated using the flow rate and Equation 1. The temperature of the reaction mixture transferred to the heat exchanger and the temperature of the reaction mixture condensed in the heat exchanger and discharged from the heat exchanger were measured using a thermometer.

In addition, a prepared SAN polymer was placed in a single-screw extruder, and extrusion was performed at 250° C. and 50 rpm to obtain a sheet-type film. Through this process, the quality of the SAN polymer was evaluated.

Test Example

The properties of specimens prepared according to Examples 1 and 2 and Comparative Example 1 were evaluated using the following method, and the obtained results are shown in Table 1 below.

Measurement Method

*Quality of SAN polymers: SAN polymer films prepared using a single-screw extruder were cut to 10 cm×10 cm, and the number of polymer gels observed on the surfaces of the SAN polymer films were counted with the naked eye. Depending on the number of polymer gels, the quality of SAN polymer was evaluated as follows. 0 to 5 polymer gels: excellent, 6 to 10 polymer gels: normal, and more than 10 polymer gels: poor.

TABLE 1

| Classification | Example 1 | Example 2 | Comparative Example 1 |
| --- | --- | --- | --- |
| Flow rate of reaction mixture transferred to heat exchanger (kg/hr) | 1270 | 1210 | 2098 |
| Flow velocity of reaction mixture transferred to heat exchanger after spraying (m/sec) | 1.31 | 1.26 | 2.27 |
| Temperature of reaction mixture transferred to heat exchanger after spraying (° C.) | 123 | 123 | 160 |
| Flow rate of spray (kg/hr) | 1270 | 1210 | 0 |
| Temperature of reaction mixture discharged from heat exchanger (° C.) | 40 | 25 | 74 |
| Quality of SAN polymer | Excellent | Excellent | Normal |

As shown in Table 1, in Examples 1 and 2 according to the present invention, a reaction mixture condensed in a heat exchanger is transferred to one side of a pipe and sprayed into the pipe. At this time, the flow of the sprayed reaction mixture is countercurrent to the flow of a vaporized reaction mixture present in the upper space of a reactor. In this case, the temperature and flow velocity of the reaction mixture transferred to the heat exchanger after spraying are reduced. Accordingly, polymerization of the reaction mixture in the heat exchanger may be suppressed, thereby extending a reaction operation cycle and improving the productivity. In addition, a phenomenon wherein a polymer present in the reactor is sucked into the heat exchanger may be suppressed, thereby improving the quality of a styrene-acrylonitrile polymer.

In Example 2, the temperature of a refrigerant used in the heat exchanger is lower than that in Example 1, such that the temperature of a reaction mixture condensed in the heat exchanger is lower than that in Example 1. However, since the flow rate of a reaction mixture transferred to the heat exchanger is lower than that in Example 1, the temperature of a reaction mixture transferred to the heat exchanger after spraying is the same as in Example 1.

On the other hand, in the case of Comparative Example 1 in which a reaction mixture condensed in a heat exchanger is re-introduced into a reactor, compared to Examples 1 and 2, the flow rate and temperature of a vaporized reaction mixture present in the upper space of the reactor are very high. As a result, a phenomenon wherein a polymer present in the reactor is sucked into the heat exchanger occurs. In addition, a vaporized high temperature reaction mixture is polymerized in the heat exchanger, and the polymerized product adheres to the inside of the heat exchanger, shortening a reaction operation cycle and reducing the productivity. In addition, a polymer present in the reactor is sucked into the heat exchanger, and the introduced polymer is allowed to grow into a polymer gel. The polymer gel is re-introduced into the reactor, resulting in degradation in the quality of the styrene-acrylonitrile polymer.

The invention claimed is:

1. A method of preparing an aromatic vinyl compound-vinyl cyanide compound polymer, comprising:
   polymerizing a reaction mixture containing 40 to 80% by weight of an aromatic vinyl compound, 10 to 35% by weight of a vinyl cyanide compound, and 5 to 35% by weight of an organic solvent in a reactor; and
   transferring the vaporized reaction mixture present in an upper space of the reactor to a heat exchanger via a pipe and condensing the vaporized reaction mixture,
   wherein the condensed reaction mixture is transferred to one side of the pipe and sprayed into the pipe.

2. The method according to claim 1, wherein the spraying is performed so that a flow of the condensed reaction mixture is countercurrent to a flow of the vaporized reaction mixture.

3. The method according to claim 1, wherein the spray comprises all or a portion of the reaction mixture transferred to the heat exchanger.

4. The method according to claim 1, wherein a temperature of the reaction mixture transferred to the heat exchanger after the spraying is 100 to 140° C., and a temperature of the reaction mixture discharged from the heat exchanger is 15 to 50° C.

5. The method according to claim 1, wherein a flow velocity of the reaction mixture transferred to the heat exchanger after the spraying is 1.0 to 2.0 m/sec.

6. The method according to claim 1, wherein the polymerization reaction is performed at a temperature of 150 to 170° C. under a pressure of 1.0 to 4.0 kgf/cm$^2$g.

7. The method according to claim 1, wherein the aromatic vinyl compound is one or more selected from the group consisting of styrene, α-methyl styrene, p-methyl styrene, p-bromostyrene, p-chlorostyrene, and o-bromostyrene.

8. The method according to claim 1, wherein the vinyl cyanide compound is acrylonitrile, methacrylonitrile, or a mixture thereof.

9. The method according to claim 1, wherein the organic solvent is one or more selected from the group consisting of toluene, ethylbenzene, xylene, methyl ethyl ketone, and methyl isobutyl ketone.

10. An apparatus for preparing an aromatic vinyl compound-vinyl cyanide compound polymer, comprising:

a reactor in which a reaction mixture containing 40 to 80% by weight of an aromatic vinyl compound, 10 to 35% by weight of a vinyl cyanide compound, and 5 to 35% by weight of an organic solvent is polymerized;

a heat exchanger for condensing the reaction mixture vaporized in the reactor;

a gas pipe for transferring the vaporized reaction mixture from an upper space of the reactor to the heat exchanger; and a condensate pipe for transferring the condensed reaction mixture from the heat exchanger to one side of the gas pipe, wherein the condensate pipe comprises a spray nozzle.

11. The apparatus according to claim 10, wherein the spray nozzle is installed so that a part or a whole thereof is located in the gas pipe and a flow of a condensed reaction mixture to be sprayed is countercurrent to a flow of a reaction mixture vaporized in the reactor.

12. A method of preparing an aromatic vinyl compound-vinyl cyanide compound polymer, comprising:

polymerizing a reaction mixture containing an aromatic vinyl compound, a vinyl cyanide compound, and an organic solvent in a reactor; and transferring the vaporized reaction mixture present in an upper space of the reactor to a heat exchanger via a pipe and condensing the vaporized reaction mixture, wherein the condensed reaction mixture is transferred to one side of the pipe and sprayed into the pipe, and wherein a temperature of the reaction mixture transferred to the heat exchanger after the spraying is 100 to 140° C., and a temperature of the reaction mixture discharged from the heat exchanger is 15 to 50° C.

* * * * *